United States Patent [19]

Bird

[11] Patent Number: 6,110,567

[45] Date of Patent: Aug. 29, 2000

[54] COMPOSITE STRUCTURAL PANEL HAVING A FACE SHEET REINFORCED WITH A CHANNEL STIFFENER GRID

[75] Inventor: Cory R. Bird, Mojave, Calif.

[73] Assignee: Scaled Composites, Inc., Mojave, Calif.

[21] Appl. No.: 09/238,100

[22] Filed: Jan. 27, 1999

[51] Int. Cl.[7] .................................. B32B 1/00; E04C 2/34
[52] U.S. Cl. ........................ 428/178; 428/175; 428/188; 52/793.1; 264/241; 264/257
[58] Field of Search ..................... 428/105, 113, 428/137, 166, 171, 175, 178, 188, 190; 52/793.1; 156/166, 204, 292, 304.7, 307.1; 264/241, 257

[56] References Cited

U.S. PATENT DOCUMENTS

| | | |
|---|---|---|
| 5,366,787 | 11/1994 | Yasui et al. ........................ 428/178 |
| 5,399,406 | 3/1995 | Matsura et al. ........................ 428/178 |
| 5,906,883 | 5/1999 | Blanc-Brude ........................ 428/178 |

*Primary Examiner*—Donald Loney

[57] ABSTRACT

A composite structural panel is formed of a single composite face sheet with a stiffener grid adhesively attached to one side of the face sheet. The stiffener grid if formed of an interlocked set of parallel first elongated grid channels extending in a first direction and parallel second elongated grid channels extending in a second direction. Each grid channel is a hollow channel section including two shear walls formed of a shear wall composite material having woven bidirectional shear wall fiber reinforcement cloth embedded in a shear wall matrix, and a cap extending between the top of each of the two shear walls. The cap is formed of a cap composite material of composite material having unidirectional cap fiber reinforcement embedded in a cap matrix, with the unidirectional cap fiber reinforcement extending parallel to the direction of elongation of the grid channel.

16 Claims, 4 Drawing Sheets

COMPOSITE STRUCTURAL PANEL HAVING A FACE SHEET REINFORCED WITH A CHANNEL STIFFENER GRID

BACKGROUND OF THE DISCLOSURE

This invention relates to a panel structure made of composite materials.

In one form of construction, a portion of an aircraft fuselage or other structure is formed of flat or curved structural panels. The structural panels are relatively thin compared to their lateral extent in two dimensions. For maximum structural efficiency, the structural panels are used without a separate strengthening framework. This type of construction, sometimes termed a monocoque structure, is to be distinguished from a structure wherein a separate internal framework provides most of the structural strength, and panels are affixed over the framework.

In this type of construction, the structural panels themselves must have mechanical properties sufficient to carry imposed structural and aerodynamic loadings. For thin structural panels, one of the most demanding and difficult-to-achieve properties is sufficient structural stiffness. That is, the structural panels must be resistant to buckling under load.

In conventional practice, such structural panels are made of a honeycomb sandwich panel structure. The honeycomb sandwich panel structure is formed of two facing, but spaced-apart, face sheets, separated by a core of an expanded metal or other type of honeycomb structure. The face sheets, which may be made of a composite material, provide load carrying capability, and the core spaces the face sheets apart by the amount required to achieve the required panel stability.

The present inventor has recognized that such honeycomb structures, while operable, have some disadvantages. Sandwich panels tend to be rather fragile. Damage to the structural panel usually is initiated from the exterior side of the panel, and the interior face sheet cannot aid in resisting such external damage. Further, the presence of the face sheet on the interior surface inhibits the inspection of the honeycomb interior and the face sheet/honeycomb bond lines of the structural panel for damage, and repair of that damage when it occurs.

Face sheet/honeycomb/face sheet structural panels are often not straight and have features therein. The fibers in the face sheets are therefore not straight, and cannot bear their full design loadings. The usual response to this situation is to make the face sheets thicker and therefore heavier.

Yet another problem is that the honeycomb material is sometimes selected to be a material that is light in weight but absorbs moisture. The increase in weight due to absorbed moisture may change the weight distribution and balance of elements such as flight control surfaces.

Available face sheet/honeycomb/face sheet structural panels are operable, but have significant drawbacks in some applications. There is therefore a need for an improved type of structural panel. The present invention provides such a structural panel, and further provides related advantages.

SUMMARY OF THE INVENTION

The present invention provides a structural panel and a method for manufacturing such a structural panel. The panel has high specific structural stiffness, yet it has only a single face sheet on the exterior side of the panel. Because there is no interior face sheet, the structural panel may be readily inspected from the interior side for damage, and such damage repaired from the interior side. An interior repair does not adversely affect the exterior aerodynamic surface of the panel. There is no concern with internal moisture absorption, as there is no enclosed honeycomb component. The structural panel of the invention may be made flat or curved, and may have features therein. Its properties may be tailored as required at various locations of the structural panel. The structural panel may be readily manufactured in large scale production.

In accordance with the invention, a composite structural panel comprises a single face sheet, and a stiffener grid joined to the face sheet with a bonding layer of a material such as an adhesive. The stiffener grid comprises a first elongated grid channel extending in a first direction of elongation and a second elongated grid channel extending in a second direction of elongation from a nodal intersection. Each grid channel comprises a hollow channel section including two shear walls. Each shear wall has a foot and a top. Each shear wall is formed of a shear wall composite material having bidirectional (preferably +/−45 degree) shear wall fiber reinforcement embedded in a shear wall matrix. A cap extends between the top of each of the two shear walls. The cap comprises a cap composite material having cap fiber reinforcement embedded in a cap matrix. At least some, and preferably all, of the cap fiber reinforcement extends parallel to the direction of elongation of the grid channel.

The structural panel may be planar (flat) or non-planar (curved). The face sheet is preferably a composite material made of face sheet fibers embedded in a face sheet matrix. The face sheet matrix is preferably a curable material that is cured during processing.

The stiffener grid is preferably a square grid with the first direction of elongation oriented at 90 degrees to the second direction of elongation. It may instead be a diamond-shape grid with the direct direction of elongation at some angle other than 90 degrees to the second direction of elongation. The grid pattern may be uniform over the entire panel, or it may be varied at different locations. The closer the parallel grid channels, the greater the resistance to bending deflection of the structural panel.

Each grid channel is a hollow channel. In such a hollow channel, the cap provides resistance to bending to the grid channel, and thence to the face sheet. The shear wall transmits shear loadings between the cap and the face sheet. To increase the resistance of the structural panel to bending deflection, the aspect ratio of the grid channel may be made as large as necessary. The aspect ratio is here defined as the height of each grid channel from the face sheet to the cap, divided by a width of each grid channel between the feet of the shear walls. Preferably, the aspect ratio is from about 0.3 to about 1.0. The hollow channel may be used to store liquid during service, as when the structural panel is the wet wall of a fuel container.

The shear wall composite material preferably is made of a fabric of two sets of shear wall fibers, such as carbon fibers, each oriented at 90 degrees to the other, embedded in a shear wall resin matrix. The shear wall resin matrix is preferably a curable material that is cured during processing. The fibers are preferably each oriented at about 45 degrees to a local normal to the face sheet. The shear walls are each preferably oriented at an angle of from about 30 to about 45 degrees to the local normal to the face sheet. The cap composite material is preferably a high-modulus, unidirectional composite material of cap fibers, such as carbon fibers, embedded in a cap resin matrix. The cap resin matrix is preferably a curable material that is cured during processing.

The face sheet fibers, the shear wall fibers, and the cap fibers may be the same or different material. The face sheet matrix, the shear wall matrix, and the cap matrix may be the same or different material. In most instances, the components are pre-cured prior to bonding them together and curing them. The composite structural panel is fabricated by separately forming the face sheet and the stiffener grid. The two elements are then bonded together with the adhesive and cured. In other cases, the face sheet matrix, shear wall matrix, the cap matrix, and the adhesive used to bond the stiffener grid to the face sheet, are all co-curable in a single curing operation.

The present invention provides a composite structural panel that is strong and stiff. It may be fabricated in flat or curved shapes, as required for particular applications. Other features and advantages of the present invention will be apparent from the following more detailed description of the preferred embodiment, taken in conjunction with the accompanying drawings, which illustrate, by way of example, the principles of the invention. The scope of the invention is not, however, limited to this preferred embodiment.

BRIEF DESCRIPTION OF THE DRAWINGS

FIGS. 6A–6C are plan views, from the stiffener grid side, of three structural panels according to the invention, wherein FIG. 6A shows a regular square stiffener grid, FIG. 6B shows a square stiffener grid whose structure varies according to location on the structural panel, and FIG. 6C shows a diamond-shaped stiffener grid.

DETAILED DESCRIPTION OF THE INVENTION

Figure 1:
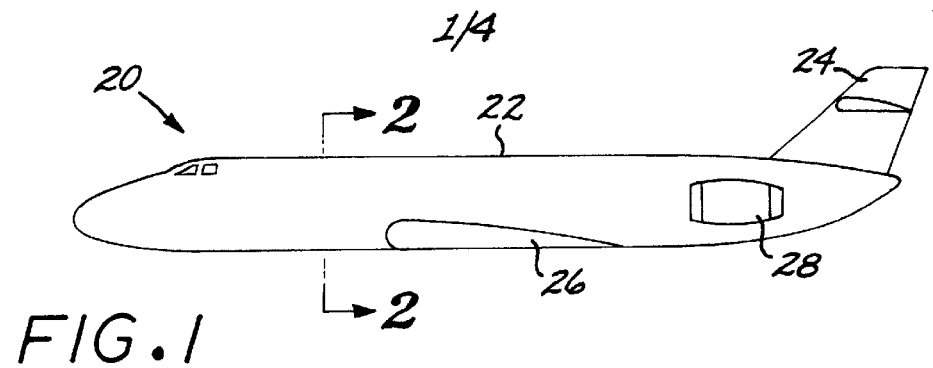
FIG. 1 is an elevational view of an aircraft made using a structural panel according to the invention.
Figure 2:
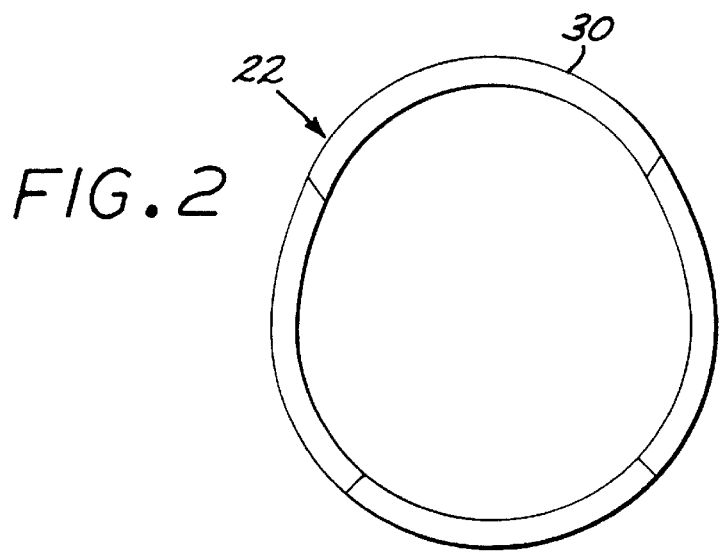
FIG. 2 is a schematic enlarged sectional view of the aircraft fuselage of FIG. 1, taken along line 2—2.

FIG. 1 depicts an example of the use of the structural panel of the invention in the construction of an aircraft 20. The aircraft 20 includes a fuselage 22, a tail 24, a wing 26, and an engine 28. FIG. 2 is a schematic sectional view of the fuselage 22. The fuselage 22 is formed of several structural panels 30 (illustrated as four structural panels 30) joined to form the generally cylindrical fuselage.

Figure 3:
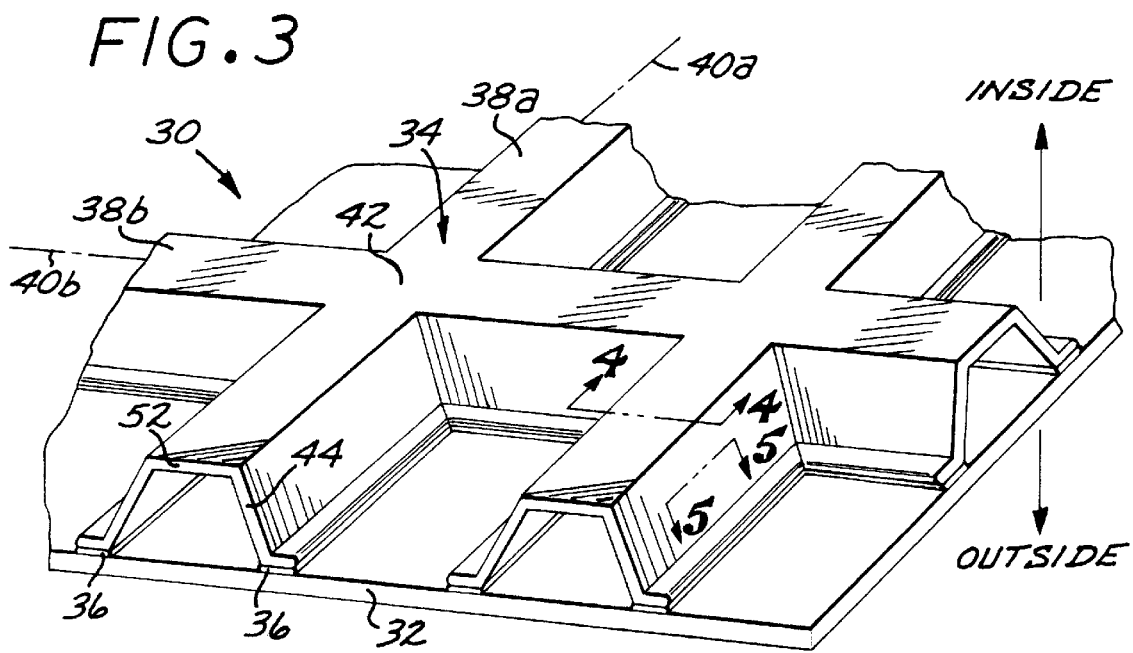
FIG. 3 is a perspective view of one of the structural panels forming the fuselage.

The structural panel 30 is illustrated in greater detail in FIG. 3. The structural panel 30, sometimes termed a thin-walled grid (TWG) herein, includes a single face sheet 32, a stiffener grid 34, and a layer of adhesive 36 bonding the stiffener grid 34 and the face sheet 32. (As used herein, "single face sheet" means that there is exactly one face sheet, not more than one face sheet or fewer than one face sheet.) In an application such as the fuselage panels of FIG. 2, the smooth outer face of the face sheet 32 faces the outside of the fuselage 22, and the stiffener grid 34 faces the inside of the fuselage 22. The stiffener grid is formed of a two-dimensional array of grid channels 38. A first elongated grid channel 38a extends in a first direction of elongation 40a, and a second elongated grid channel 38b extends in a second direction of elongation 40b. The directions of elongation 40a and 40b lie locally parallel to the plane of the face sheet 32. If the face sheet is curved, the directions of elongation lie parallel to the face sheet at the location where the directions of elongation are measured. The grid channels 38a and 38b are joined at nodes 42. In practice, there are a plurality of the first elongated grid channels 38a, all parallel to each other, a plurality of the second elongated grid channels 38b, all parallel to each other, and a plurality of the nodes 42 joining the parallel grid channels 38a and 38b. This arrangement of nodes 42 and grid channels 38 produces an interlocking effect that stiffens the grid 34 and imparts good strength at the nodes.

Some of the advantages of the invention are evident from FIG. 3. There is only a single face sheet 32. Stiffening is provided by the stiffener grid 34, which covers part but not all of the side of the face sheet 32 to which it is bonded. The remainder of the face sheet 32 is visible from the side of the stiffener grid 34. This visibility allows this side of the face sheet 32 and the stiffener grid 34 to be readily inspected for damage from the inside and repaired if necessary. On the other hand, a honeycomb panel with two face sheets cannot be visually inspected in this manner, and repair is much more difficult. Another advantage is that, for a set unit areal weight of the structural panel 30, the single face sheet 32 may be made thicker than in those panels where two face sheets are used. This allows the single face sheet 32 of the present invention to be more damage resistant than the outwardly facing face sheet of a two-face-sheet panel. The use of a single face sheet also precludes the possibility of trapping moisture within the core of a sandwich panel, a concern for some core materials.

The nodes 42 provide hard points for attachment to the inner wall of the structural panel. That is, attachment of additional structure such as bulkheads, flooring, racks, and the like to conventional face sheet/honeycomb/face sheet material is difficult. Such attachments may be easily made to the nodes 42 of the present structure, without substantial loss of functionality of the structural panel 30. The nodes 42 act as natural hard points because adjacent layers of composite material overlap at the nodes, strengthening them to permit the attachment.

The presence of the stiffener grid 34 provides strength and stiffness around through-holes in the thin-walled grid structural panel. That is, the structure retains substantial strength and stiffness despite through-holes which are intentionally present (e.g., windows, doors, instrumentation openings, bays) or unintentionally present (e.g., damage openings).

Figure 4:
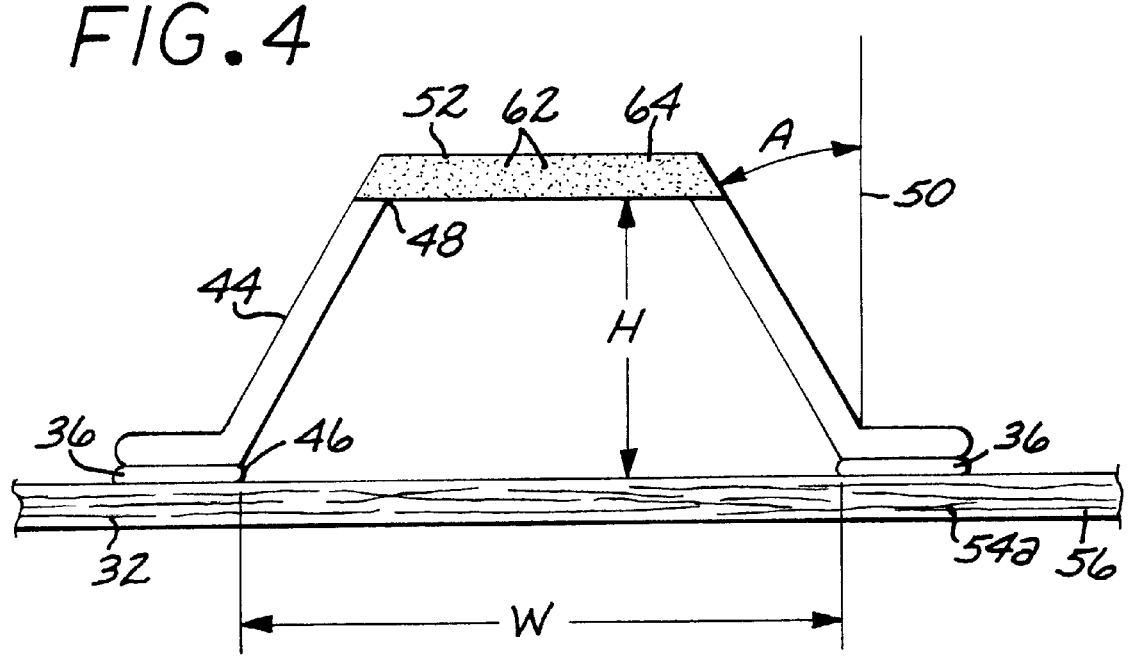
FIG. 4 is a sectional view of the structural panel of FIG. 3, taken along line 4—4.

As illustrated in FIG. 4, each grid channel 38 includes two spaced-apart shear walls 44. Each shear wall 44 has a foot 46 adjacent to the face sheet 32, and a top 48 remote from the face sheet 32. The shear walls 44 are preferably inclined at an angle A of from about 30 to about 45 degrees to a local normal line 50 to the face sheet 32. A "local normal line" is a line perpendicular to the face sheet, at the location where the measurement is being made. If A is less than about 30 degrees, the preferred +/−45 degree fibers cannot be formed. If A is greater than about 45 degrees, the structure is not efficient and the shear webs are not stable. If the face sheet is flat, all normal lines are parallel. If the face sheet is curved, the proper normal line is that taken at the location where the shear wall lies immediately adjacent to the face sheet.

A cap 52 extends between the top 48 of each of the two shear walls 44. The shear walls 44 and the cap 52 together define a channel shape. When the stiffener grid 34 is bonded to the face sheet 32, the shear walls 44, the cap 52, and the face sheet 32 together define a hollow volume inside the channel. The cap 52 of the grid channel 38 functions to stiffen the structural panel 30. The shear walls 44 transmit shear loadings from the face sheet 32 to the cap 52. An "aspect ratio" of the grid channel 38 is defined as the height H of each grid channel 33 from the face sheet 32 to the cap 52, divided by a width W of each grid channel 38 between the feet 46 of the shear walls 44. Preferably, the aspect ratio is from about 0.3 to about 1.0. The greater the aspect ratio, the further the cap 52 from the face sheet 32, and the greater the bending stiffness of the structural panel. However, as the aspect ratio increases, the thickness of the structural panel increases and the more structurally unstable are the grid channels 38. Preferably, at least about 30 percent of the mass of a unit length of each channel is in the cap.

The face sheet 32, the shear walls 44, and the cap 52 are preferably formed of composite materials of reinforcing fibers in a matrix. Typically, however, the fibers are arranged and oriented differently in each of the face sheet 32, the shear walls 44, and the cap 52, according to their required functioning. The following description is the preferred structure of these composite materials, although other structures are operable.

Figure 5:
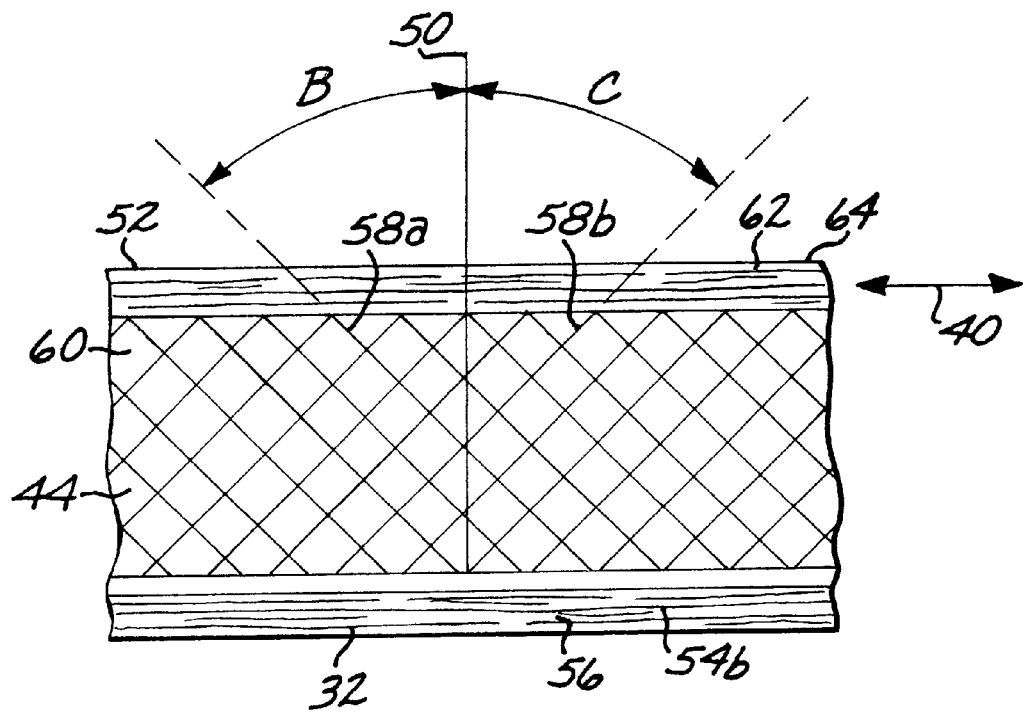
FIG. 5 is a sectional view of the structural panel of FIG. 3, taken along line 5—5.

The face sheet 32 is preferably formed of face sheet fiber reinforcement 54 in a face sheet matrix 56. The face sheet fiber reinforcements 54 typically are bidirectional in the plane of the face sheet 32. That is, the face sheet fiber reinforcements 54a and 54b are oriented in two different directions, both lying in the plane of the face sheet 32. The face sheet fiber reinforcements 54a and 54b are preferably oriented at 90 degrees to each other. The bidirectionality is seen in the two orientations illustrated in FIGS. 4 and 5. These two different directions may be accomplished by using a fabric having bidirectional face sheet fibers, or by having multiple plies of unidirectional face sheet fibers. The face sheet fiber reinforcements 54 are preferably carbon fibers, and the face sheet matrix 56 is preferably a thermosetting resin such as an epoxy.

The shear walls 44 are preferably formed of shear wall fiber reinforcement 58 in a shear wall matrix 60. The shear wall fiber reinforcements 58 typically are bidirectional in the plane of the shear wall 44. That is, the shear wall fiber reinforcements 58a and 58b are oriented in two different directions, both lying in the plane of the shear wall 44. The bidirectionality is seen in the two orientations illustrated in FIG. 5. The shear wall fiber reinforcements 58a and 58b are preferably oriented at 90 degrees to each other. The shear wall fiber reinforcement 58a is preferably oriented at an angle B of about −45 degrees to the local normal 50, when viewed in elevation as in FIG. 5, and the shear wall fiber reinforcement 58b is preferably oriented at an angle C of about +45 degrees to the local normal 50. The orientation of the fibers in these two different directions may be accomplished by using a fabric having bidirectional face sheet fibers, or by having multiple plies of unidirectional face sheet fibers. The shear wall fiber reinforcements 58 are preferably carbon fibers, and the shear wall matrix 60 is preferably a thermosetting resin such as an epoxy.

The cap 52 is preferably formed of cap fiber reinforcement 62 embedded in a cap matrix 64. The cap fiber reinforcements 62 typically are unidirectional in the plane of the cap 52, and parallel to the direction of elongation 40. That is, the cap fiber reinforcements 62 are oriented in a single direction, parallel to the direction of elongation 40. The unidirectionality is seen in the single orientation illustrated in FIGS. 4 and 5. This single orientation may be accomplished by using tows of fibers embedded in the matrix. The cap fiber reinforcements 62 are preferably carbon fibers, and the cap matrix 64 is preferably a thermosetting resin such as an epoxy.

Although the various fiber reinforcements are preferably all carbon or fiberglass fibers, the same or different types of carbon or fiberglass fibers may be used. That is, the modulus of elongation and/or strength of the various carbon fibers 54, 58, and 62 may be different. The various matrices 56, 60, and 64 may be the same or different.

The adhesive layer 36 is also preferably a thermosetting adhesive such as an epoxy. The composition of the adhesive may be the same or different than the compositions of the matrices 56, 60, and 64.

Figure 6A:
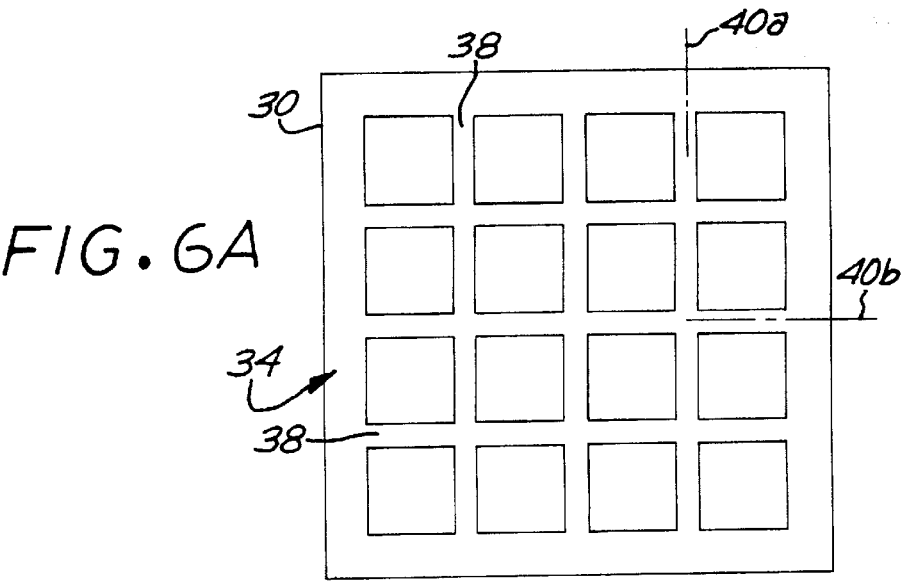
Figure 6B:
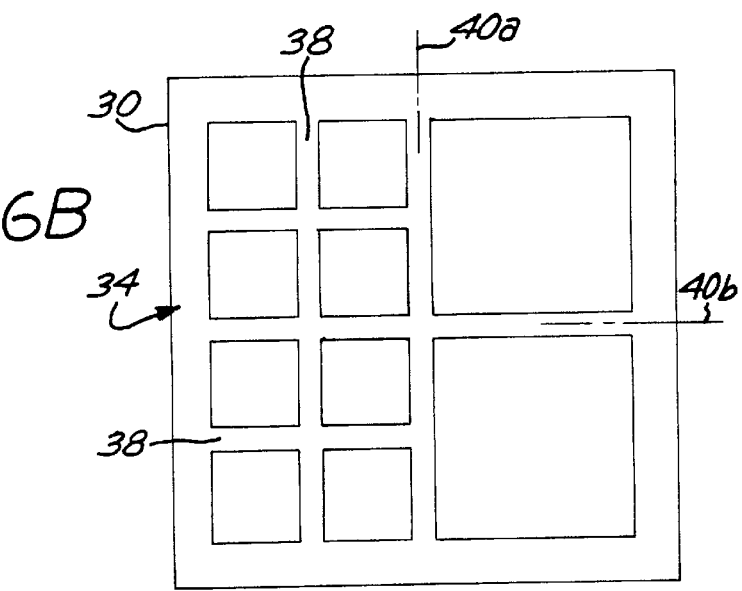

The pattern of the stiffener grid 34 may be selected according to the requirements of the structural panel 30. That is, for some applications, the pattern of the grid channels 38 is uniform across the entire width and breadth of the structural panel 30, as illustrated in FIG. 6A. For other applications, the pattern varies according to the location on the structural panel 30, as illustrated in FIG. 6B. The parameters of the grid channels 38 may also be uniform across the entire width and breadth of the structural panel 30, or they may vary according to location. Such controllable parameters include, for example, the height H, the width W, the thickness of the cap 52, the types of fibers and matrices in the cap 52 and the shear walls 44, and the number of plies in the shear walls 44.

The present invention is not intended to establish precise configurations and parameters for the various controllable parameters of the structural panel 30. Such configurations and parameters are determined by structural designers according to the requirements for each structure. Instead, the present invention provides manufacturing engineers with the capabilities to build structural panels 30 as specified by the structural designers.

Figure 6C:
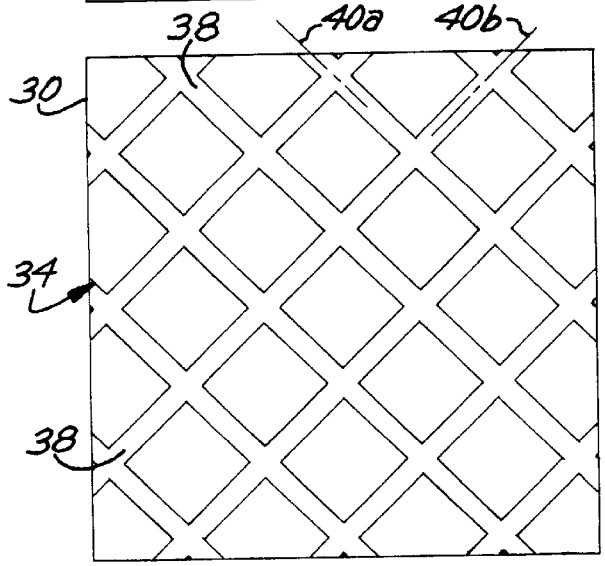

The shape of the stiffener grid 34 may also be selected. FIGS. 6A and 6B illustrate square or rectangular stiffener grids, where the directions of elongation 40a and 40b are oriented at 90 degrees to each other. FIG. 6C illustrates a diamond-shaped stiffener grid 34, where the directions of elongation 40a and 40b are oriented at other than 90 degrees to each other.

Figure 7:
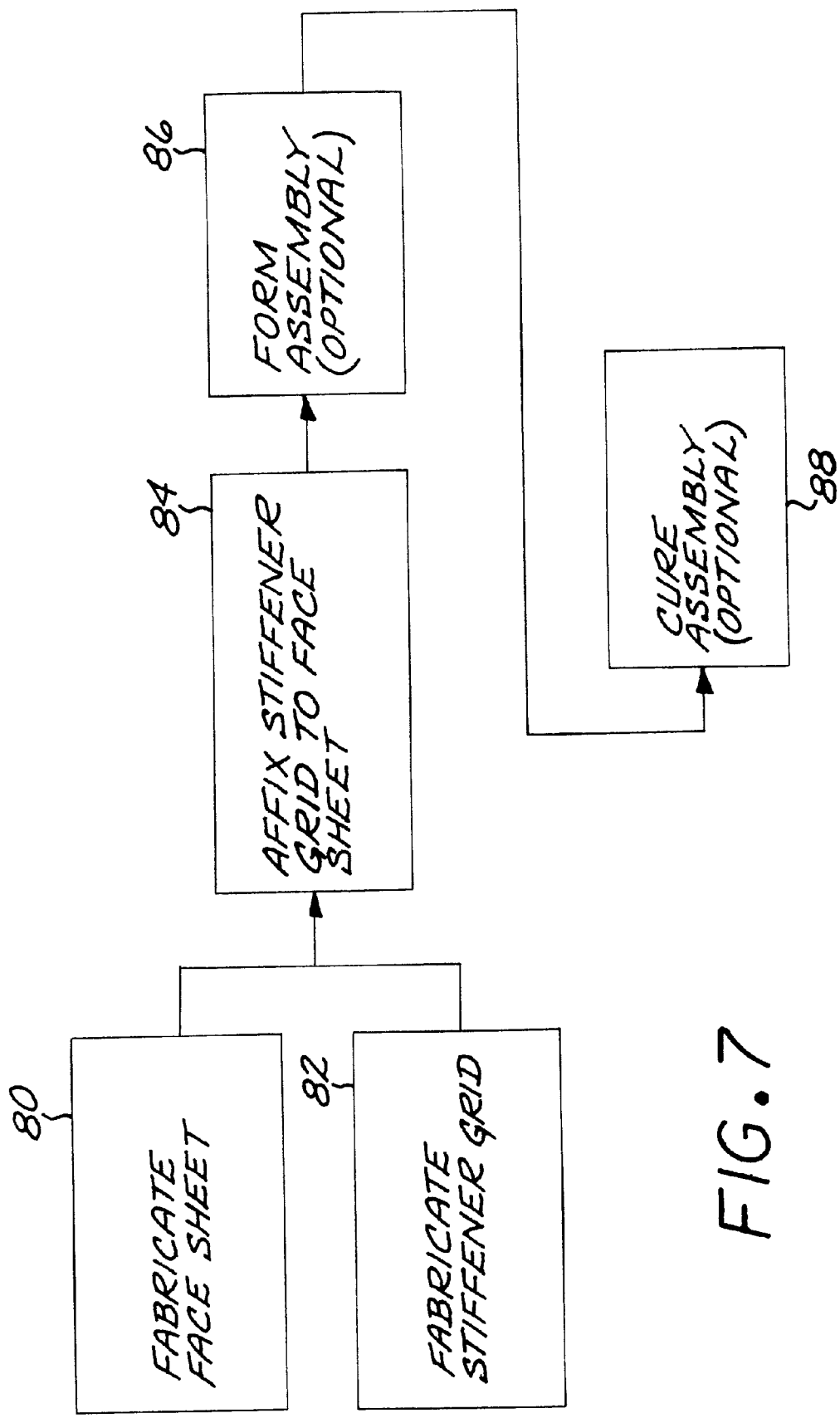
FIG. 7 is a block flow diagram of an approach for fabricating the composite structural panel.

FIG. 7 illustrates a preferred approach for fabricating a structural panel 30 according to the invention. The face sheet 32 is fabricated, numeral 80, and the stiffener grid 34 is separately fabricated, numeral 82. The face sheet and stiffener grid are fabricated by conventional procedures, preferably collation processes in which plies of bidirectional or unidirectional prepreg material are collated on forms or molds. Because the face sheet and the stiffener grid are manufactured separately, optimal fabrication procedures may be selected for each. For example, the face sheet may be collated on a female or male tool with sheets of prepreg material, and the stiffener grid may be prepared on a different machine optimized for preparation of the channel structure. The materials used in the shear walls 44 and the cap 52 are typically provided in the form of prepreg layers of composite material. These layers are interleaved and overlapped during the collation portion of the manufacturing operation, leading to excellent strength, low weight, and damage tolerance of the grid channel 38 and its nodes 42.

The face sheet 32 and the stiffener grid 34 may be partially or completely cured as part of the respective fabrication steps 80 and 82. Complete curing precludes subsequent forming, but that is acceptable for most flat structural panels 30 and many curved panels 30.

The stiffener grid 34 is affixed to the face sheet 32, numeral 84. The affixing is preferably accomplished by bonding the stiffener grid 34 to the face sheet 32 with the adhesive layer 36. The adhesive is typically applied to the foot 46 of the stiffener grid 34, and the stiffener grid 34 is inverted and placed onto the surface of the face sheet 32.

Optionally, the assembly at this point may be formed, numeral 86. If the stiffener grid 34 and the face sheet 32 are either uncured or partially cured in respective steps 80 and 82 and still formable, the entire assembly may be deformed to a desired shape. For example, the affixing step 84 may be accomplished with the face sheet 32 flat, and then the face sheet 32 and the stiffener grid 34 bent to a curved shape in forming step 86. On the other hand, if the stiffener grid 34 and the face sheet 32 were cured to a point that they are not deformable in their respective fabrication steps 80 and 82, forming step 86 is not feasible. If forming step 86 is performed, deforming devices such as press tools and forming dies may be used.

The assembly is optionally final cured and post-cured if necessary, numeral 88. The curing is accomplished to cure any remaining uncured or partially cured elements, such as the matrices 56, 60, and 64, and the adhesive 36. The curing is normally accomplished in appropriate tooling, and the cured assembly is removed and post-cured in a freestanding manner, if desired. Curing and post-curing are accomplished according to the recommendations for the materials. If two or more of the elements 56, 60, 64, and 36 are to be cured in the curing step 88, they should be compatibly selected to be co-curable.

Specimens of the thin-walled grid structure of the invention have been prepared and comparatively tested against conventional face sheet/honeycomb/face sheet structural panels. The thin-walled grid structure of the invention must be approximately twice as thick as a conventional structural panel of the same weight, to achieve the same stiffness. Even though the thin-walled grid structure is thicker, it has the advantages of a thicker external skin, better inspectability, and more complete use of the internal volume of the structure, such as for fuel storage. Moreover, making the thin-walled grid structure approximately 2.5 times as thick results in a 20 percent improvement in stiffness for the same weight as the conventional structural panel.

When the thin-walled grid structure is tested to failure in shear, it fails through the material of the shear wall 44 or the material of the face sheet 32. There is no peel or other failure through the bond line of the adhesive layer 36. Consequently, secondary fasteners are not required to attach the grid channel 38 to the face sheet 32, an important savings of weight for an aircraft structure.

Although a particular embodiment of the invention has been described in detail for purposes of illustration, various modifications and enhancements may be made without departing from the spirit and scope of the invention. Accordingly, the invention is not to be limited except as by the appended claims.

What is claimed is:

1. A composite structural panel, comprising:
    a single face sheet;
    a stiffener grid, the stiffener grid comprising a first elongated grid channel extending in a first direction of elongation and a second elongated grid channel extending in a second direction of elongation from a nodal intersection, each grid channel comprising a hollow channel section including
        two shear walls, each shear wall having a foot and a top, each shear wall being formed of a shear wall composite material having bidirectional shear wall fiber reinforcement embedded in a shear wall matrix, and
        a cap extending between the top of each of the two shear walls, the cap comprising a cap composite material having cap fiber reinforcement embedded in a cap matrix, at least some of the cap fiber reinforcement extending parallel to the direction of elongation of the grid channel; and
    a bonding layer between the face sheet and the foot of each of the two shear walls of each grid channel.

2. The composite structural panel of claim 1, wherein the shear wall composite material comprises unidirectional shear wall fibers oriented at 90 degrees to each other.

3. The composite structural panel of claim 2, wherein the two sets of unidirectional shear wall fibers are each oriented at about 45 degrees to a local normal to the face sheet.

4. The composite structural panel of claim 1, wherein the two shear walls are each oriented at an angle of from about 45 degrees to about 90 degrees to a local normal to the face sheet.

5. The composite structural panel of claim 1, wherein the first direction of elongation is oriented at about 90 degrees to the second direction of elongation.

6. The composite structural panel of claim 1, wherein an aspect ratio of a height of each grid channel from the face sheet to the cap divided by a width of each grid channel between the feet of the shear walls, is from about 0.3 to about 1.0.

7. The composite structural panel of claim 1, wherein the face sheet is planar.

8. The composite structural panel of claim 1, wherein the face sheet is non-planar.

9. The composite structural panel of claim 1, wherein the bonding layer comprises an adhesive.

10. A composite structural panel, comprising:
    a single face sheet;
    a stiffener grid, the stiffener grid comprising an interlocked plurality of parallel first elongated grid channels extending in a first direction and parallel second elongated grid channels extending in a second direction, each grid channel comprising a hollow channel section including
        two shear walls, each shear wall having a foot and a top, each shear wall being formed of a shear wall composite material having woven bidirectional shear wall fiber reinforcement cloth embedded in a shear wall matrix, wherein the two shear walls are each oriented at an angle of from about 30 degrees to about 45 degrees to a local normal to the face sheet, and
        a cap extending between the top of each of the two shear walls, the cap comprising a cap composite material having unidirectional cap fiber reinforcement embedded in a cap matrix, the unidirectional cap fiber reinforcement extending parallel to the direction of elongation of the grid channel; and
    an adhesive layer between the face sheet and the foot of each of the two shear walls of each grid channel.

11. The composite structural panel of claim 10, wherein the shear wall fiber reinforcement cloth comprises fibers in a nonmetallic matrix, and wherein the fibers are selected from the group consisting of carbon fibers and glass fibers.

12. The composite structural panel of claim 10, wherein the cap composite material comprises fibers in a nonmetallic matrix, and wherein the fibers are selected from the group consisting of carbon fibers and glass fibers.

13. The composite structural panel of claim 10, wherein the stiffener grid is substantially uniform at all locations thereof.

14. The composite structural panel of claim 10, wherein at least about 30 percent of the mass of a unit length of each channel is in the cap.

15. A method for manufacturing a composite structural panel, comprising:

fabricating a face sheet;

fabricating a stiffener grid separately from the face sheet, the stiffener grid comprising an interlocked plurality of parallel first elongated grid channels extending in a first direction and parallel second elongated grid channels extending in a second direction, each grid channel comprising a hollow channel section including two shear walls, each shear wall having a foot and a top, each shear wall being formed of a shear wall composite material having woven bidirectional shear wall fiber reinforcement cloth embedded in a shear wall matrix, and a cap extending between the top of each of the two shear walls, the cap comprising a cap composite material having unidirectional cap fiber reinforcement embedded in a cap matrix, the unidirectional cap fiber reinforcement extending parallel to the direction of elongation of the grid channel;

affixing the stiffener grid to the face sheet to form an uncured assembly; and curing the uncured assembly.

16. The method of claim 15, including an additional step, after the step of affixing and before the step of curing, of forming the uncured assembly.

* * * * *